United States Patent [19]
Konopka

[11] Patent Number: 4,862,013
[45] Date of Patent: Aug. 29, 1989

[54] CONSTANT CURRENT SOURCE AND BATTERY CHARGER

[75] Inventor: John G. Konopka, Barrington, Ill.

[73] Assignee: Zenith Electronics Corporation, Glenview, Ill.

[21] Appl. No.: 272,194

[22] Filed: Nov. 16, 1988

Related U.S. Application Data

[62] Division of Ser. No. 127,745, Dec. 2, 1987, Pat. No. 4,829,259.

[51] Int. Cl.$^4$ ............... H03K 17/60; H03K 17/04
[52] U.S. Cl. ................ 307/254; 307/296.6; 307/246; 307/300; 307/549; 323/289; 323/282; 320/39; 320/21; 320/40; 320/35
[58] Field of Search .......... 307/246, 270, 296 A, 307/297, 549, 570, 571, 23, 24, 48, 66, 85, 86, 300; 323/289, 282; 320/39, 21, 31, 40, 35

[56] References Cited

U.S. PATENT DOCUMENTS

| | | | |
|---|---|---|---|
| 3,011,076 | 11/1961 | Bain | 307/254 |
| 3,602,794 | 8/1971 | Westhaver | 320/39 |
| 3,657,572 | 4/1972 | Millman | 307/297 |
| 4,005,317 | 1/1977 | Hinrichs | 307/253 |
| 4,097,773 | 6/1978 | Lindmark | 307/296 A |
| 4,472,672 | 9/1984 | Pacholok | 320/21 |
| 4,554,463 | 11/1985 | Norbeck et al. | 307/297 |
| 4,577,144 | 3/1986 | Hodgman et al. | 320/21 |
| 4,710,695 | 12/1987 | Yamada et al. | 320/21 |

*Primary Examiner*—Stanley D. Miller
*Assistant Examiner*—Nancy Thai

[57] ABSTRACT

A constant current battery charger includes a bucking regulator comprising a power switch transistor, a diode, an inductor and a voltage sensitive switch with adjustable delay for controlling the power switch transistor. The hysteresis or delay is obtained with a Schmitt trigger and the effect is a stable pulse width modulator in which the duty cycle of the power switch transistor is varied. A temperature sensor adds resistance to change the sensitivity of the switch and reduce charging current when a predetermined battery temperature is reached. A speed up circuit consisting of a shorting transistor is connected across the base-emitter of the switch transistor.

3 Claims, 2 Drawing Sheets

CONSTANT CURRENT SOURCE AND BATTERY CHARGER

This application is a division of application Ser. No. 127,745, filed 12/2/87, now U.S. Pat. No. 4,829,259, issued May 5, 1989.

BACKGROUND OF THE INVENTION AND PRIOR ART

This invention relates generally to constant current sources and speed up circuits for transistor switches and particularly to a novel battery charger utilizing a constant current source and speed up circuit.

Constant current sources are well-known in the art for delivering a fixed RMS value of current under varying conditions of load. Battery chargers are also well-known in the art for supplying current for charging batteries. The invention in one major aspect is directed to a novel constant current source arrangement that is particularly useful in a battery charger.

High speed transistor switching circuits, particularly those used with single-ended power supplies, are limited by the time required to remove base current to the transistor. In double-ended power supplies, i.e., those providing positive and negative operating potentials, the problem of rapidly removing base current is simplified as compared with single-ended supplies where one side of the supply is held at ground potential.

The speed up circuit aspect of the present invention is useful with a single-ended power supply to rapidly remove the base drive to a switch transistor and thereby result in a dramatic enhancement of its switching characteristics. The decrease in switching time enables a significant reduction in heat dissipation in the transistor and permits utilization of a much smaller heat sink. An added advantage of the inventive speed up circuit is that conventional transistor switching circuits may be operated at much higher frequencies.

In many applications, such as in portable television receivers and computers where the batteries comprise a very large part of the overall device cost, it is desirable to use rechargeable battery packs. Rechargeable battery packs generally have nickel cadmium batteries, the useful lives of which are highly dependent upon the manner in which they are recharged. It is common for a manufacturer to guarantee a battery pack for a minimum number of cycles of operation, i.e., discharges and recharges, provided that the batteries are recharged under controlled conditions. Nickel cadmium batteries are best charged either with a low continuous current or with a larger constant current until a certain battery temperature is attained. To do otherwise can have an adverse effect on their useful lives. Consequently, the equipment used to recharge the battery pack needs to be carefully designed. As battery recharging circuits are often built into the powered device, space and weight are at a premium and a high efficiency recharging circuit is desirable.

The present invention is directed to a switching type recharging circuit for supplying a constant RMS current to a battery pack. For the battery pack used, the manufacturer specifies a charging rate of 1.2 amps until a case temperature of 55° C. is attained or a continuous charge of 200 milliamps. The circuit constructed in accordance with one aspect of the invention accomplishes this with very high efficiency, on the order of 84%. When used with the speed up circuit aspect of the invention, an efficiency in excess of 90% is attained. Further, the current supplied to the battery changes less than 1% throughout its charging voltage range.

As will be apparent, the constant current source utilized in the battery charger of the invention will readily find other uses, such as for driving the deflection system in a television receiver or monitor. The constant current source of the invention combines a so-called buck regulator and a voltage sensitive switch with an adjustable hysteresis or delay, to form an oscillator having a duty cycle, the ON time of which is determined by the connected load. Similarly, the speed up circuit will find applicability in many circuit arrangements having a single-ended power supply. In particular, it will find ready application to high voltage systems in television receivers.

OBJECTS OF THE INVENTION

A principal object of the invention is to provide a novel battery charger.

Another object of the invention is to provide a novel constant current source.

Still another object of the invention is to provide a novel speed up circuit for a transistor switch.

A further object of the invention is to provide a highly efficient battery charger for delivering constant current to a battery.

BRIEF DESCRIPTION OF THE DRAWINGS

These and other objects and advantages of the invention will be apparent upon reading the following description in conjunction with the accompanying drawings, in which like reference numbers indicate like elements.

DESCRIPTION OF THE PREFERRED EMBODIMENT

Figure 1:
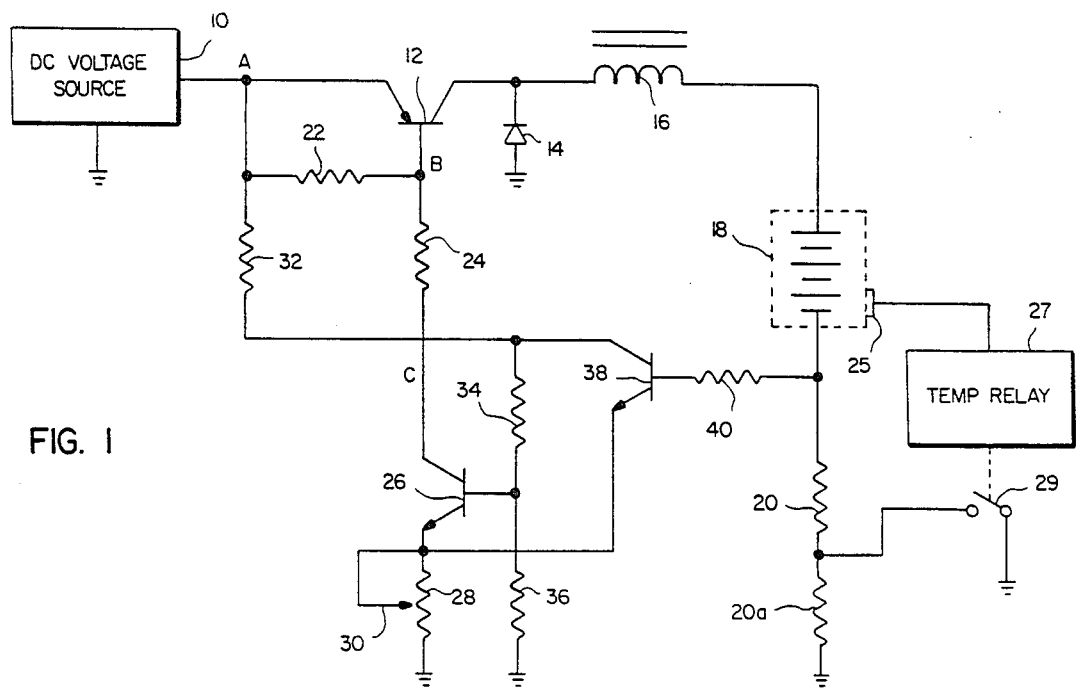
FIG. 1 is a schematic diagram of a battery charger and constant current source constructed in accordance with one aspect of the invention.

Referring to FIG. 1, a source of DC voltage 10 is coupled to the emitter of a PNP power switch transistor 12, the collector of which is connected to the junction of the cathode of a diode 14 and one terminal of an inductor 16. The other terminal of the inductor 16 is coupled to the positive terminal of a battery pack 18, the negative terminal of which is returned to ground through series connected current detector resistors 20 and 20a. Diode 14 has its anode connected to ground. DC voltage source 10 is also connected to the base of power switch transistor 12 through a resistor 22 and to a voltage divider consisting of three series-connected resistors 32, 34 and 36. The base of power switch transistor 12 is coupled through a resistor 24 to the collector of an NPN transistor 26, the emitter of which is connected to ground, through a movable tap 30 on a potentiometer 28, and the base of which is connected to the junction of resistors 34 and 36. The emitter of NPN transistor 26 is also connected to the emitter of another transistor 38 having its collector connected to the junction of resistors 32 and 34 and its base connected through a resistor 40 to the junction of battery 18 and resistors 20 and 20a. Under normal conditions, resistor 20a is shorted out by a connection to ground through a contact 29. Transistors 26 and 38 are connected to form a Schmitt trigger for providing hysteresis or delay in the ON and OFF cycling of power switch 12. The letters A, B and C will be discussed in connection with FIG. 4.

A temperature sensor 25 is arranged with respect to battery pack 18 to measure the case temperature. This may be accomplished in any number of well-known ways. Sensor 25 is coupled to a temperature relay 27 which operates a contact 29 when the temperature measured by sensor 25 indicates that the limit temperature for the battery pack 18 has been reached. Contact 29 is opened by relay 27 to remove the short circuit around resistor 20a.

In operation, the circuit forms an oscillator, the ON time of which is controlled by the connected load, i.e., the state of charge of the battery pack 18. The battery charge is reflected in its terminal voltage and, in the preferred embodiment, may range from 0–34 volts. A requirement of the circuit is that the potential applied by DC voltage source be approximately 4 volts higher than the highest terminal voltage attainable by battery 18. When the circuit is activated, for example, by a switch (not shown), transistor 26 and power switch transistor 12 are driven conductive. This is due to the forward bias established by resistors 32, 34 and 36 which drives transistor 26 conductive, thereby turning on power switch transistor 12. The collector-emitter current of transistor 26 flows through potentiometer 28 which develops a positive potential at the emitter of transistor 38. Conduction of power switch transistor 12 produces an increasing current ramp through inductor 16, battery pack 18 and current detector resistor 20 (resistor 20a is shorted). The current ramp increases at a steady rate until the voltage developed across current detector resistor 20 exceeds the voltage across potentiometer 28 by 0.7 of a volt (the base-emitter conduction potential for transistor 38). Transistor 38 conducts and immediately shorts out the base current drive to transistor 26 by effectively connecting the junction of resistors 32 and 34 to the emitter of transistor 26. Transistor 26 ceases conduction and power switch transistor 12 is driven non-conductive. At this time, the energy stored in the field of inductor 16 is released as the field collapses and a decreasing ramp of current flows through battery pack 18, resistor 20 and diode 14.

Resistor 32 is much larger than resistor 24 and consequently, the current flow through potentiometer 28 is greatly reduced. This path is from DC voltage source 10 through resistor 32 through the collector-emitter junction of transistor 38 through potentiometer 28 to ground. The prior path, it will be recalled, was through resistor 22 and 24 and the collector-emitter path of transistor 26. Consequently, the potential across potentiometer 28 drops significantly (on the order of 500%) which permits transistor 38 to remain conductive despite the decreasing voltage across resistor 20. Therefore, power switch transistor 12 is held in cutoff while the energy in the collapsing field of inductor 16 continues to cause current flow in battery 18 and resistor 20. When the voltage across resistor 20 drops from its peak value by 500%, transistor 38 ceases conduction and permits transistor 26 (and power switch 12) to conduct again. Resistor 40 is for current limiting purposes only. When the potential across resistor 20 is sufficiently low, transistor 38 no longer can conduct and the cycle repeats with transistor 26 being driven conductive and again turning on power switch transistor 12. The oscillatory cycle continues with the duty cycle (and frequency of operation) of transistor 12 being changed as the potential across battery pack 18 increases during charging.

Figure 2:
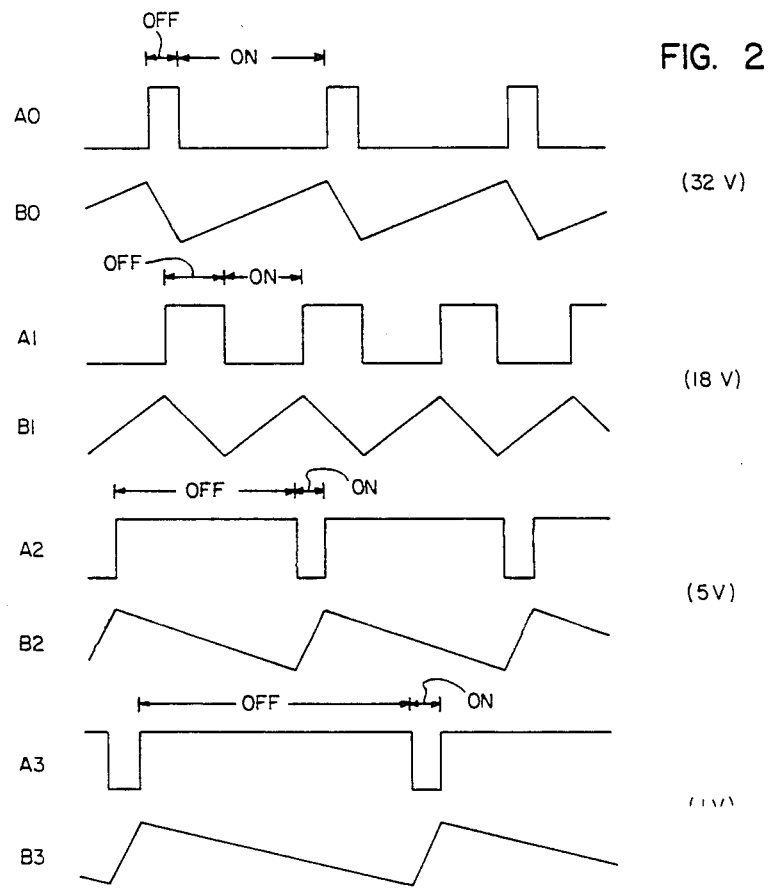
FIG. 2 is a series of waveforms depicting the duty cycle and current flow characteristics of the circuit of FIG. 1.

Reference to FIG. 2 indicates this relationship. The curves are arranged to show voltage across the power switch and battery current for battery terminal voltages of 32V, 18V, 5V and 1V. The upper ones of the curves A0–A3 show the voltage across the emitter-collector of power switch transistor 12 and the lower ones of the curves B0–B3 depicts the current flow into battery pack 18. Beginning with the lowest curve set A3 and B3, representing a battery having a voltage across its terminal of one volt, it will be seen that the ON time of the power switch transistor is very short whereas its OFF time is quite long. As the battery terminal voltage is raised, the OFF time of switch transistor 12 gets shorter and the ON time gets longer. Also the frequency of oscillation changes. It can readily be seen that the circuit is self-regulating and delivers a constant RMS current to the load under a wide range of varying load conditions.

Should the temperature of battery pack 18 achieve the limit temperature specified by the manufacturer (in this instance 55° C.), contact 29 will remove the short circuit around resistor 20a and add sufficient resistance to keep transistor 38 conductive for a much longer period. The added resistance is selected to maintain a 200 milliamp constant charge current.

Figure 3:
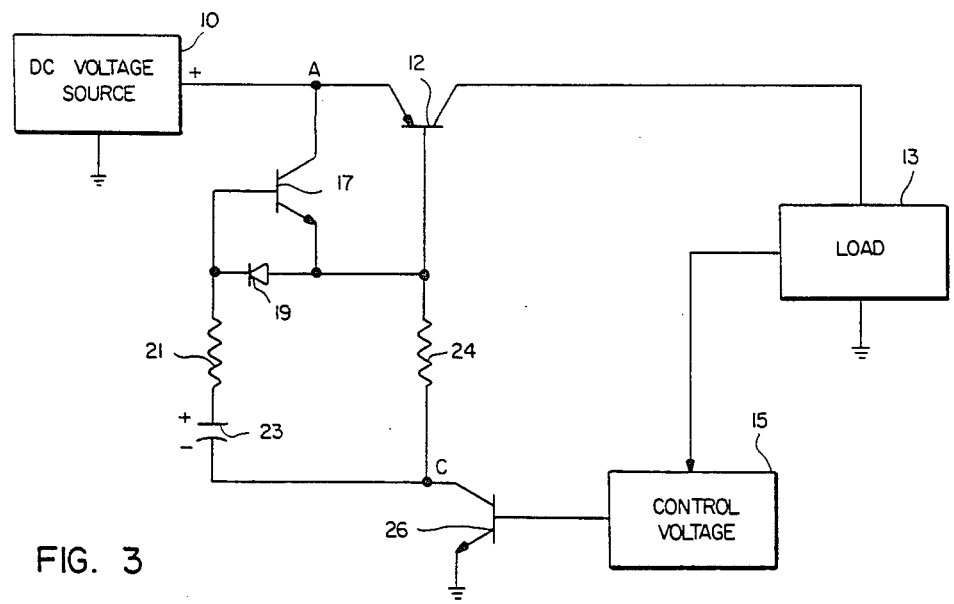
FIG. 3 represents a combined block diagram of a transistor switch incorporating a speed up circuit constructed in accordance with another aspect of the invention.

Referring to FIG. 3, a single-ended DC potential source 10 is coupled to the emitter of PNP switch transistor 12 that has its collector connected to a load circuit 13 instead of to diode 14 and inductor 16 as in FIG. 1. Load circuit 13 is coupled to a control voltage source 15 that supplies the base of an NPN trigger transistor 26. Transistor 26 controls the turn on and turn off of switch transistor 12. The collector of trigger transistor 26 is connected to the base of switch transistor 12 through a resistor 24. The emitter-base junction of switch transistor 12 is connected across the collector-emitter junction of an NPN shorting transistor 17. The base of shorting transistor 17 is connected to the junction of the cathode of a diode 19 and a resistor 21. The other end of resistor 21 is connected, through a small capacitor 23, to the collector of trigger transistor 26 and the anode of diode 19 is connected to the emitter of shorting transistor 17.

The elements comprising shorting transistor 17, diode 19, resistor 21 and capacitor 23 take the place of the normal emitter-base resistor 22 of switch transistor 12 (as seen in FIG. 1). Assuming trigger transistor 26 is conductive, switch transistor 12 is conductive and a voltage drop exists across resistor 24. The collector of trigger transistor 26 is at substantially ground potential and capacitor 23 is charged in the polarity indicated. Shorting transistor 17 is non-conductive.

In response to an appropriate negative going potential signal from control voltage source 15, trigger transistor 26 is driven non-conductive. As its collector potential begins to rise, e.g., trigger transistor 26 begins to turn off, capacitor 23 discharges through resistor 21, the base-emitter junction of shorting transistor 17 and resistor 24. This occurs very rapidly and a large peak current of short duration, sufficient to drive shorting transistor 17 into saturation, is developed. Shorting transistor 17 responds by immediately shorting out the base-emitter junction of switch transistor 12 and quickly drawing away its base charge. The rapid depletion in base charge results in a very fast cutoff transistion time. When the control voltage from control voltage source 15 becomes positive going trigger transistor 26 is again driven conductive. An initial conductive circuit in parallel with resistor 24 is established through diode 19, resistor 21, capacitor 23 and the saturated collector-emitter junction of transistor 26 to ground. Current flow in this circuit is from the base of switch transistor 12 and is typically ten times greater than the current which flows through resistor 24. This higher than normal current is what accounts for the increased turn-on speed of switching transistor 12. As capacitor 23 charges, the current through the base of switch transistor 12 drops in value. When capacitor 23 is completely charged, the only current flowing through the base of switch transistor 12 is that which flows through resistor 24.

The increase in turn on/turn off speed of switch transistor 12 in a battery charger circuit constructed in accordance with FIG. 1 had a dramatic effect on circuit efficiency. The switching time decreased from 500 nanoseconds, with the base-emitter resistor embodiment shown in that application, to 20 nanoseconds—a 25-fold decrease in switching time. Similar increases in switching speed have been observed when the inventive speed up circuit was employed in a television high voltage switch application. The increased switching speed of the battery charger produced about a 10% increase in efficiency and reduced the need for heat sinking.

Figure 4:
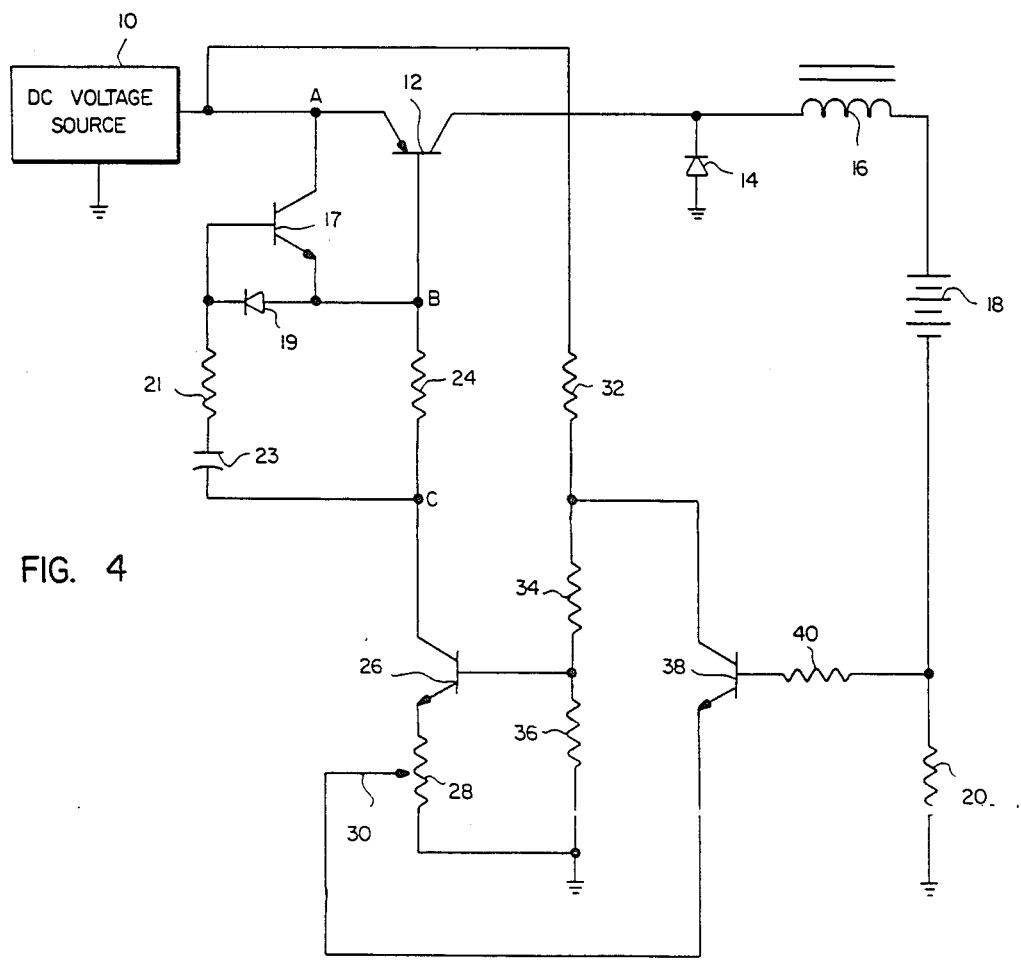
FIG. 4 is a battery charger of FIG. 1 utilizing the high speed switch of FIG. 3.

Referring to FIG. 4, a battery charger circuit arrangement substantially as shown in FIG. 1 incorporates the high speed switching circuit of the present invention. As indicated by the letters A, B and C on FIG. 1 and FIG. 4, the high speed switching circuit arrangement of FIG. 4 may be substituted for the emitter-base resistor 22 of switch transistor 12 in FIG. 1. The operation of the battery charger portion of FIG. 4 will be briefly described.

As mentioned, the circuit forms an oscillator, the ON time of which is controlled by the connected load, i.e., the state of charge of the battery 18. When the circuit is turned on, transistor 26 and power switch transistor 12 are driven conductive. Potentiometer 28 develops a positive potential at the emitter of transistor 38. The increasing current ramp through inductor 16, battery 18 and current detector resistor 20 causes the voltage developed across current detector resistor 20 to exceed the voltage across potentiometer 28 by 0.7 of a volt and transistor 38 conducts and immediately shorts out the base current drive to transistor 26, which ceases conduction to drive power switch transistor 12 non-conductive.

Resistor 32 is much larger than resistor 24 and consequently, the current flow through potentiometer 28 is greatly reduced. This path is from DC voltage source 10 through resistor 32 through the collector-emitter junction of transistor 38 through potentiometer 28 to ground. The prior path, it will be recalled, was through resistor 22 and 24 and the collector-emitter path of transistor 26. Consequently, the potential across potentiometer 28 drops significantly (on the order of 500%) which permits transistor 38 to remain conductive despite the decreasing voltage across resistor 20. Therefore, power switch transistor 12 is held in cutoff while the energy in the collapsing field of inductor 16 continues to cause current flow in battery 18 and resistor 20. When the voltage across resistor 20 drops 500% from its peak value, transistor 38 ceases conduction and permits transistor 26 (and power switch 12) to conduct again. Resistor 40 is for current limiting purposes only. When the potential across resistor 20 is sufficiently low, transistor 38 no longer can conduct and the cycle repeats with transistor 26 being driven conductive and again turning on power switch transistor 12. The oscillatory cycle continues with the duty cycle (and frequency of operation) of transistor 12 being changed as the potential across battery 18 increases during charging.

The speed up circuit of the present invention operates as described above in connection with FIG. 3 to accelerate the switching transistions of switch transistor 12 to thereby obtain further improvements in switching speed and efficiency.

What has been described is a novel battery charging circuit which includes a novel constant current source and a novel speed up circuit. It is recognized that numerous changes in the described embodiment of the invention will be apparent to those skilled in the art without departing from its true spirit and scope. The invention is to be limited only as defined in the claims.

What is claimed is:

1. A speed up circuit for a power transistor switch operated from a single-ended power supply comprising:
   a switch transistor coupled between said power supply and a load circuit;
   control means for controlling the conduction of said switch transistor in response to a control signal;
   said control means comprising a shorting transistor connected across the base-emitter junction of said switch transistor and trigger means, including a trigger transistor, for rapidly driving said shorting transistor into conduction in response to said control signal; and
   a diode coupled across the base-emitter circuit of said shorting transistor and a resistor and capacitor series circuit connected between said diode and the load circuit of said trigger transistor.

2. The circuit of claim 1 wherein said resistor and capacitor and said diode are connected in parallel with the load circuit of said trigger transistor.

3. The circuit of claim 2 wherein said load circuit of said trigger transistor comprises a resistor.

* * * * *